United States Patent
Klassen et al.

(10) Patent No.: US 7,215,440 B2
(45) Date of Patent: May 8, 2007

(54) FAST INTERPOLATION OF LARGE COLOR LOOKUP TABLES

(75) Inventors: R. Victor Klassen, Webster, NY (US); Thyagarajan Balasubramanian, Webster, NY (US)

(73) Assignee: Xerox Corporation, Stamford, CT (US)

( * ) Notice: Subject to any disclaimer, the term of this patent is extended or adjusted under 35 U.S.C. 154(b) by 1227 days.

(21) Appl. No.: 09/750,552

(22) Filed: Dec. 28, 2000

(65) Prior Publication Data

US 2002/0122207 A1    Sep. 5, 2002

(51) Int. Cl.
  *G06F 15/00* (2006.01)
  *H04N 1/46* (2006.01)

(52) U.S. Cl. .................. 358/1.9; 358/525

(58) Field of Classification Search ............... 345/600; 358/518, 1.9, 520, 523, 525, 2.1, 530; 382/300, 382/162; 708/290
See application file for complete search history.

(56) References Cited

U.S. PATENT DOCUMENTS

| | | | | |
|---|---|---|---|---|
| 4,837,722 A * | 6/1989 | Sara | ............................. | 708/290 |
| 5,142,675 A * | 8/1992 | Oi et al. | ...................... | 718/104 |
| 5,390,035 A * | 2/1995 | Kasson et al. | .............. | 358/518 |
| 5,398,121 A * | 3/1995 | Kowalewski et al. | ........ | 358/504 |
| 5,432,892 A * | 7/1995 | Hafner et al. | ................ | 345/591 |
| 5,471,324 A * | 11/1995 | Rolleston | ...................... | 358/518 |
| 5,481,583 A * | 1/1996 | Heuscher | ......................... | 378/4 |
| 5,581,376 A * | 12/1996 | Harrington | ................... | 358/518 |
| 5,748,176 A * | 5/1998 | Gondek | ....................... | 345/600 |
| 5,751,926 A * | 5/1998 | Kasson et al. | .............. | 345/419 |
| 5,862,253 A | 1/1999 | Schuneman et al. | | |
| 5,870,077 A * | 2/1999 | Dillinger et al. | ............. | 345/600 |
| 5,917,963 A * | 6/1999 | Miyake | ...................... | 382/300 |
| 6,040,925 A * | 3/2000 | Vondran et al. | .............. | 358/525 |
| 6,049,400 A | 4/2000 | Vondran, Jr. | | |
| 6,163,617 A * | 12/2000 | Heuscher et al. | ............ | 382/132 |
| 6,278,747 B1 * | 8/2001 | Hutchins et al. | ............. | 375/340 |
| 6,496,608 B1 * | 12/2002 | Chui | ........................... | 382/300 |
| 6,760,489 B1 * | 7/2004 | Kuwata | ....................... | 382/300 |
| 6,985,543 B1 * | 1/2006 | Sutardja | ...................... | 375/345 |

OTHER PUBLICATIONS

European Search Report, Application No. EP 01 13 0304, Dated May 27, 2005, The Hague, Examiner A. Hardell.

* cited by examiner

*Primary Examiner*—Madeleine A V Nguyen
(74) *Attorney, Agent, or Firm*—Fay Sharpe LLP

(57) ABSTRACT

A method for converting a specified color value from a first color space to a second color space identifies the specified color value in the first color space. A converted color space value is received from a final lookup table. The converted color space value is previously determined as a function of the specified color value and a mid-point interpolation and represents the specified color in the second color space. The converted color space value is stored in a memory device.

20 Claims, 4 Drawing Sheets

FAST INTERPOLATION OF LARGE COLOR LOOKUP TABLES

BACKGROUND OF THE INVENTION

The present invention relates to transforming a color from a first color space to a second color space. It finds particular application in conjunction with interpolating within a three-dimensional lookup table and will be described with particular reference thereto. It will be appreciated, however, that the invention is also amenable to other like applications.

Color correction or transformation of color images is performed to convert images from one color space to another. Images may be represented using a device independent color space or a device dependent color space. Device independent color spaces represent color images independent from particular input and output devices so as to enable independent color imaging between input and output devices. Generally, a color image is transformed to a device dependent color space of an output device before the color image is rendered to ensure that the colorimetry of the original image is consistent with its reproduction. Such a transformation is performed regardless of whether the original image is defined in a device dependent color space or in a device independent color space. Closed systems that consist, for example, of a scanner and a printer that are not interconnected with external devices do not require an original color image to be transformed to a device independent color space. Such closed systems have color transformation systems that generate a color image represented by a first color space and subsequently convert that color space to a second color space before reproduction. Color transformation systems capable of independent color imaging represent color images in a third or a device independent color space which is readily transferable between a plurality of image output devices.

Color images can be generated by an input image terminal such as a scanner or a color image creation program operating on a color workstation. Color images processed by a scanner or a workstation consists of a two-dimensional array of picture elements (pixels). The color of each pixel of an image may be represented using a plurality of color spaces. Scanner output is commonly transformed to a color space of tristimulus values, for example, additive primaries red, green and blue (RGB) color space. These values are typically a linear transformation of the standard XYZ coordinates of CIE color space, or a corrected transform of those values. In the case of computer generated images, the computer workstation is operated by a user to create, edit, or view "softcopy" color images on the color monitor of the workstation. Colors selected by the user at the user interface of a workstation can also be defined in a color space of tristimulus values such as additive primaries RGB.

An image generated by an image input terminal must be converted to subtractive primaries cyan, magenta, yellow and black (CMYK) or (simply the CMY) color space before being reproduced on an image output terminal such as a printer. CMY color space is typically used to represent the formulation of colored dyes, inks, or toners on paper. Printers typically operate by adding multiple layers of ink or colorant on each page. The response of the addition of colors by the printer tends to be relatively non-linear. Consequently, colors are defined for a particular printer and accordingly color spaces defined for a printer are device dependent. Thus, a printer receives information in a device independent color space from, for example, a workstation. The printer must then convert that information into its device dependent color space. There exist many different methods to convert between color spaces of images produced at a scanner or a workstation to a color space of images to be produced at a printer.

Color correction consists of mapping points from a three-dimensional color space to a three-or-more-dimensional color space. This mapping depends on the physical properties of a marking device or printer system which is typically nonlinear (as noted above). An effective approach to solving this problem is to use a coarse three-dimensional lookup table with interpolation. The lookup table provides an arbitrary mapping between different devices and the interpolation reduces the size of the table so that large amounts of memory are not required by the system to store a large number of sample points. In general, a lookup table contains values on a uniform grid for each of the three color coordinates of a color space. A common approach to interpolation is tri-linear interpolation which gives a linear weighting of all eight vertices. Alternatively, in tetrahedral interpolation the parallelepiped is divided into tetrahedra. The points within each tetrahedron are interpolated based on its four vertices. While tetrahedral interpolation is adequate for finding individual points at a lookup table of $16^3$ nodes, it performs unnecessary computations when used with tables of $64^3$ nodes or more.

More specifically, because color is defined with three (3) variables, a three-dimensional lookup table is commonly used. In RGB space, at a scanner or computer, space can be defined as three-dimensional with black at the origin of a three-dimensional coordinate system 0, 0, 0, and white at the maximum of a three dimensional coordinate system which in an 8-bit system, would be located at 255, 255, 255. Each of the three (3) axes radiating from the origin point, therefore, define red, green, and blue, respectively. A similar construct can be made for the printer, with axes representing cyan, magenta, and yellow. In the 8-bit system suggested, there will be, however, over 16 million possible colors (i.e., $256^3$), which are too many values for a 1:1 mapping of RGB to CMY within a reasonable amount of space. Accordingly, only a relatively small number of samples are conventionally used to do the mapping from RGB to CMY.

The lookup table is conventionally constructed using slow methods that combine measured data with mathematical modeling. The time required to construct such a table of size $16^3$ ranges from several minutes to one or two hours, depending on the method used. Constructing a large table of size $256^3$ (where no interpolation is required) or even $64^3$, requires 4096 or 64 times as long, respectively. For example, if it takes 1 second to compute an entry, it will take 68 minutes to compute the 4096 entries of a $16^3$ table. At that rate, it will take 194 days to compute the $2^{24}=16,777,216$ entries in a $256^3$ table, and 72 hours, 49 minutes to compute the $2^{18}=262,144$ entries in a $64^3$ table. Thus, computing a table at such high density using conventional techniques is impractical.

The present invention provides a new and improved method and apparatus which overcomes the above-referenced problems and others.

SUMMARY OF THE INVENTION

A method for converting a specified color value from a first color space to a second color space identifies the specified color value in the first color space. A converted color space value is received from a final lookup table. The converted color space value is previously determined as a function of the specified color value and a mid-point interpolation and represents the specified color in the second color space. The converted color space value is stored in a memory device.

In accordance with one aspect of the invention, before the converted color space value is received, the final lookup table is created as a function of an initial lookup table, which has a lower resolution relative to the final lookup table and includes a plurality of the conversion values.

In accordance with another aspect of the invention, a number of mid-point interpolations is performed for a current color of interest as a function of the resolution of the final lookup table.

In accordance with a more limited aspect of the invention, the mid-point interpolation is performed by determining an anchor vertex, which is defined within the final lookup table, as a function of the current color, and determining a current vertex, which is defined within the final lookup table, as a function of the current color and the anchor vertex. A current intermediate color is determined by performing a mid-point interpolation as a function of the anchor and current vertices.

In accordance with an even more limited aspect of the invention, if more than one mid-point interpolation is performed, a second current vertex, which is defined within the final lookup table, is determined as a function of the current color, the anchor vertex, and the current vertex. A second current intermediate color is determined by performing a mid-point interpolation as a function of the second current vertex and one of the anchor and first current vertices.

In accordance with another aspect of the invention, the anchor vertex and the current vertex are determined by determining a vertex, which is defined within the final lookup table, as a function of a node in the first color space having largest coordinates less than corresponding coordinates of the specified color.

In accordance with another aspect of the invention, if the final lookup table is less than a predefined resolution, a plurality of intermediate color space conversion values are received from the final lookup table. The converted color space value is determined as a function of the intermediate color space conversion values.

In accordance with a more limited aspect of the invention, if the predefined resolution is half the resolution of the input colors, two conversion values are received from the final lookup table.

An advantage of the present invention is that it provides a relatively fast technique for finding individual points at a granularity of 256×256×256 within a lookup table having 64×64×64 nodes.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

To simplify discussion in the following, we shall refer to number of inter-node spaces along one dimension of a lookup table as the table resolution. Thus a 17×17×17 table, which has $17^3$=4913 nodes, has a resolution of 16. The table may also be viewed as containing 16×16×16 cubes, each containing 8 nodes. All of the cubes except those at the gamut boundaries share all of their vertices (nodes) with neighboring cubes. Those at the gamut boundaries share some but not all of their vertices with neighboring cubes. A given cube is identified by the location of its lower left, front vertex (i.e. the vertex with the lowest coordinate values). Indices into the table for all nodes that are the lower left, front vertex for some cube require 4 bits, so, the table is said to have 4 bit resolution.

Figure 1:
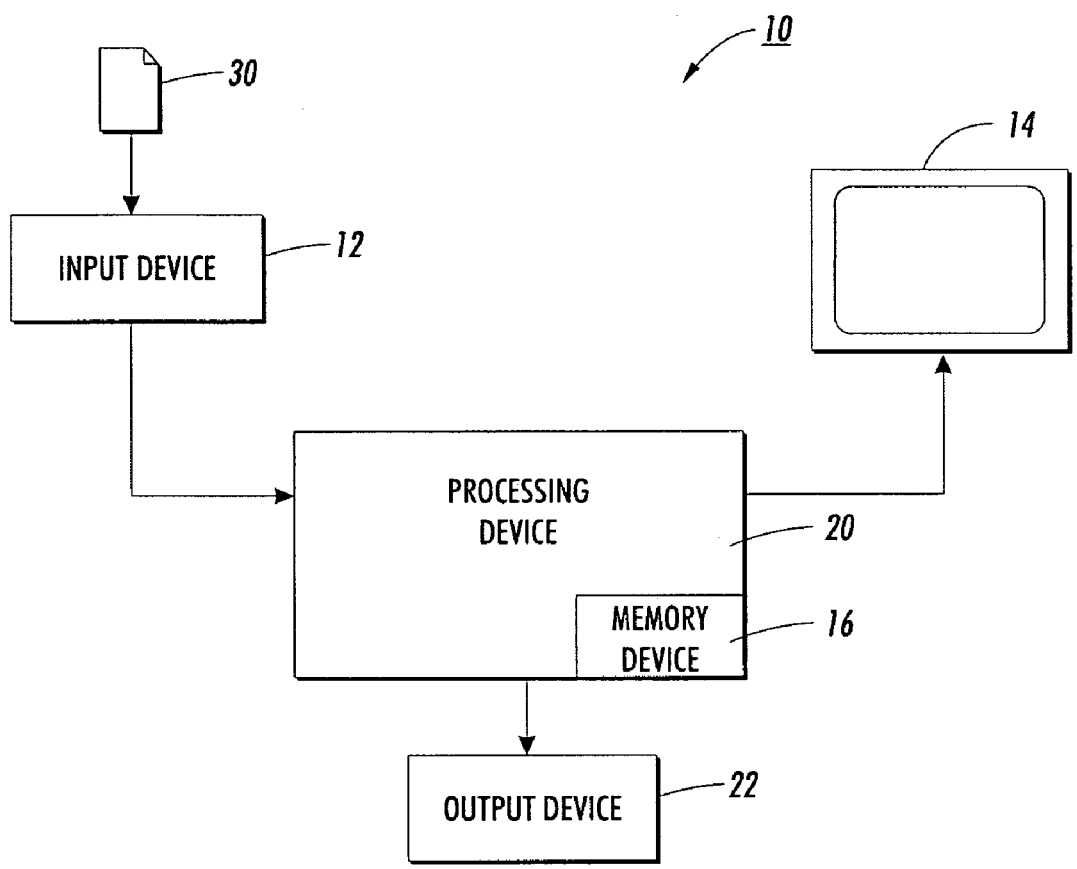
FIG. 1 illustrates a system for converting a color value from a first color space to a second color space according to the present invention.
Figure 2:
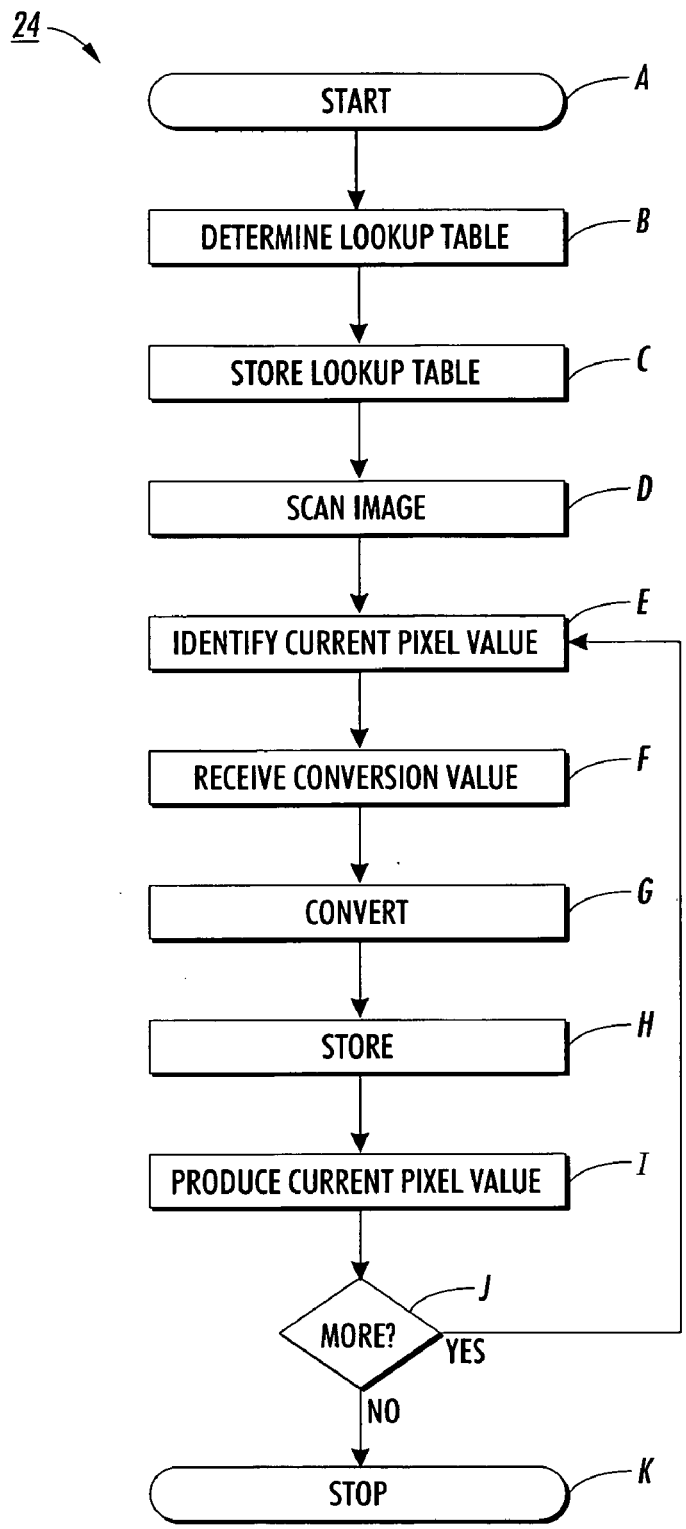
FIG. 2 illustrates a flowchart for converting a color value from a first color space to a second color space according to the present invention.

With reference to FIGS. 1 and 2, a system 10 for converting a specified color value (pixel value) from a first (initial) color space to a second (final) color space includes an input device 12 (e.g., a scanning device), a display device 14, a memory device 16, a processing device 20, and an output device 22. The processing device 20 communicates with both the memory device 16 and the output device 22. In the preferred embodiment, the memory device 16 is included within the processing device 20; however, other configurations are also contemplated. It is to be understood that the first and second color spaces may be, for example, device dependent color spaces (e.g., RGB or CMYK) or colorimetric color spaces (e.g., L*a*b*). Furthermore, the display device 14 may, for example, operate in the RGB color space, while the input and output devices 12, 22, respectively, operate in the CMYK color space.

A method 24 for converting the specified color value (pixel value) from the first color space to the second color space begins in a step A. A three-dimensional lookup table, preferably stored in the memory device 16, for converting the color value between the color spaces is assumed to have three or four bit resolution (i.e., 9×9×9 or 17×17×17 nodes). As will be described in more detail below, a final lookup table, which has six, seven or eight bit resolution (i.e., 65×65×65, 129×129×129 or 257×x257×x257) nodes, is determined in a step B. The final lookup table is stored in the memory device 16 in a step C. Because the final lookup table has more nodes than the initial lookup table, the final lookup table has a higher resolution relative to the initial lookup table. The nodes of the lookup tables include conversion values (transformation values) for converting (transforming) respective color values (pixel values) from the initial color space to the final color space.

Once the final lookup table is determined, an image 30 is scanned, in a step D, into the memory device 16. It is to be understood that the image 30 is scanned in a first color space (e.g., a device dependent color space such as RGB) and converted to a second color space (e.g., a colorimetric color space such as L*a*b*) before it is stored in the memory device 16. Furthermore, the image data is converted on a pixel-by-pixel basis.

A current pixel value (specified color) to be converted is identified, in a step E, within the image 30. A conversion value (transformation value), which is selected as a function of the current pixel value, is received into the processing device 20 from the final lookup table in a step F. If the resolution of the final lookup table is less than eight bit, multiple intermediate conversion values are selected, and processing continues with a step G; otherwise a single conversion value is selected, and processing passes to a step H. In step G, a single conversion value is calculated from the multiple conversion values. The single conversion value is stored in the memory device 16 in step H. In this way, the current pixel value is converted from the first color space to the second color space, and stored in the memory device 16.

It is to be understood that a similar conversion process may be implemented for converting the current pixel value to the appropriate color space for the output device 22. In this situation, the current pixel value is optionally produced, in a step I, via the output device 22. The output device 22 is preferably a digital output device (e.g., printing device), which operates in a xerographic environment, which produces either black-&-white or color output.

A determination is made, in a step J, whether more pixel values remain to be converted in the image 30. If more pixel values are to be converted, control returns to the step E for identifying the next current pixel value. If more pixel values are not to be converted, control passes to a step K for stopping the process.

Figure 3:
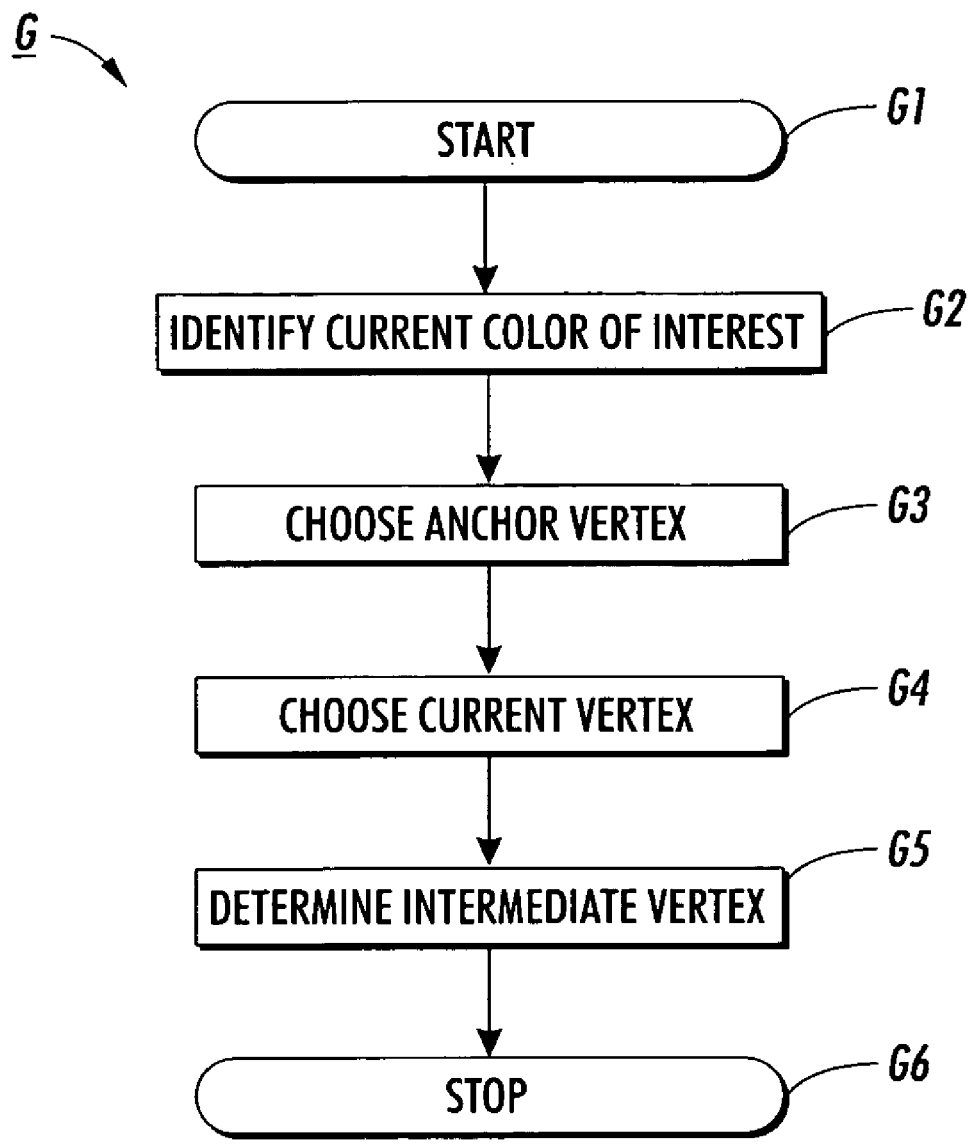
FIG. 3 illustrates a flowchart for determining a lookup table according to the present invention.

With reference to FIG. 3, the step G of converting the current pixel starts in a step G1. In one preferred embodiment, the resolution of the final lookup table is assumed to be $2^7$ (129×129×129 nodes). A current color of interest is identified in a step G2.

Figure 4:
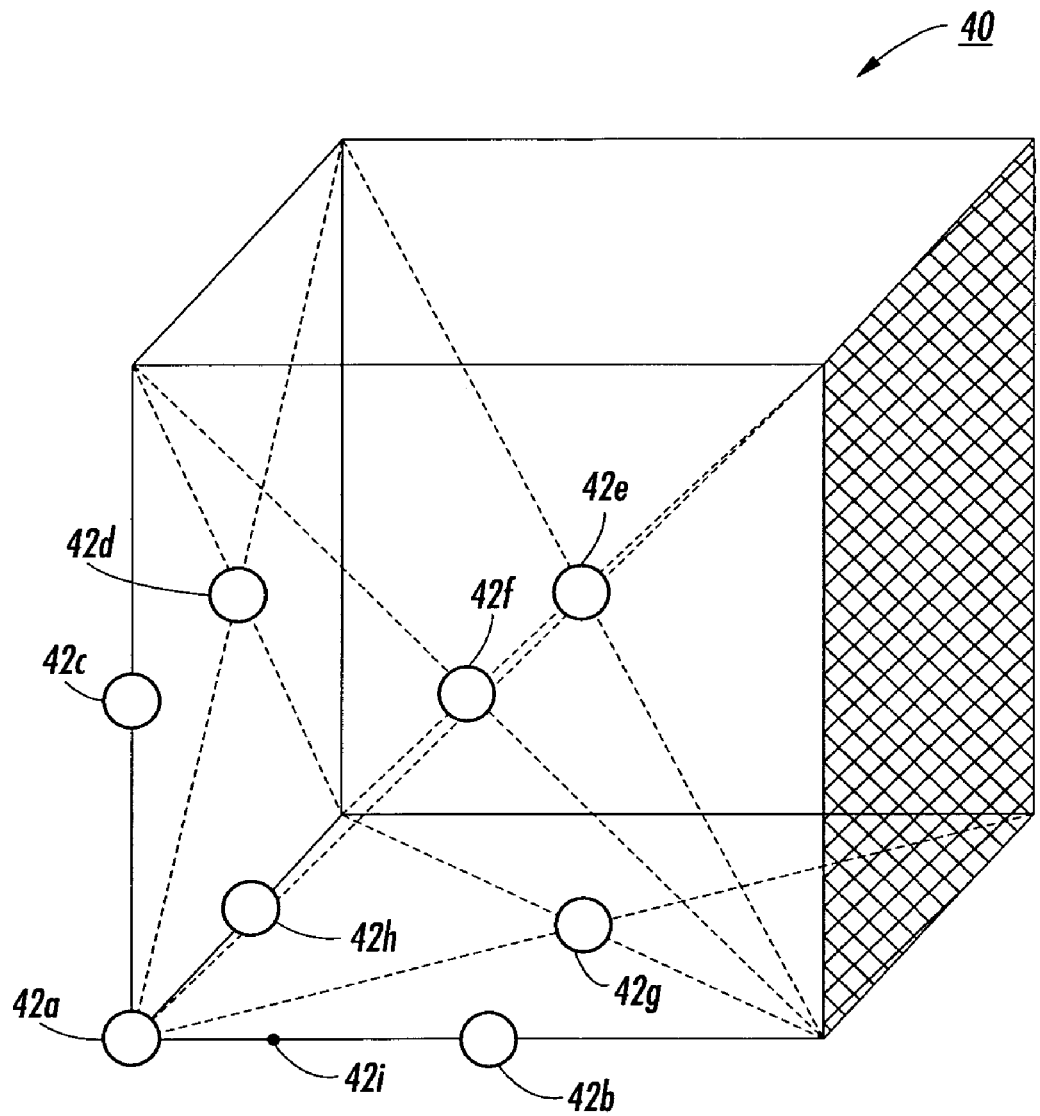
FIG. 4 illustrates a portion of a color space according to the present invention.

With reference to FIGS. 3 and 4, the final lookup table is represented as a cube 40 of 129×129×129 nodes (vertices). Then, the only locations (vertices) of concern (other than at the gamut boundaries) are those points 42a, 42b, 42c, 42d, 42e, 42f, 42g, 42h (vertices) marked with spheres. Other points are shared with other like cubes. It is clear from FIG. 4 that, if the final lookup table has 7 bit resolution, then to find any point at 8 bit resolution, it is sufficient to average one of the vertices 42a, 42b, 42c, 42d, 42e, 42f, 42g, 42h (an anchor vertex) with one of the anchor vertex's seven (7) neighbors. For example, the lower, left vertex 42a is chosen as the anchor vertex in a step G3. Then, one of the seven (7) neighboring vertices 42b, 42c, 42d, 42e, 42f, 42g, 42h, is chosen, in a step G4, as a current vertex (e.g., 42b). The anchor vertex 42a is the closest node with coordinates in the initial color space less than those of the current color of interest. The current vertex 42b is selected so that the current color of interest lies midway along a line from the anchor vertex and the current vertex 42b. That is, it is the node that identifies the cube containing the current color of interest. An intermediate vertex (intermediate color) 42i is determined, in a step G5, via a mid-point point interpolation between the anchor vertex 42a and the current vertex 42b. The process stops in a step G6.

In a second embodiment the final table resolution is $2^6$, or 6 bits. A simple method of determining the conversion is to first locate a pair of intermediate nodes. These intermediate nodes are those nodes in a hypothetical $2^7$ bit grid that would contribute to the computation of the converted pixel value for the current color of interest. These nodes are then calculated in a method analogous to the method for converting from 7 to 8 bit resolution. To obtain the final color, the intermediate nodes are used to convert from 7 to 8 bit resolution. This simple conversion apparently involves three times the operations that are required to go from 7 to 8 bit resolution: two times to get the two intermediate nodes, and once to use them. However, as will be shown below, it is possible to reduce the cost to less than twice the cost of going from 7 to 8 bit resolution.

The mid-point interpolation averaging operations discussed in the present invention involve significantly smaller computational cost than tetrahedral and other conventional interpolation methods. A mid-point p between two points q and r is given mathematically by $p=(q+r)/2$. In a software implementation, this may be represented as $p=((q+r+1)>>1)$. Hence, a midpoint subdivision requires two (2) adds and a shift. If we wish to compute two (2) mid-point averaging operations, we have $p=(s+(q+r)/2)/2$, and this translates in software to $p=(q+r+(s<<1)+2)>>2)$ (which requires three (3) adds and two (2) shifts). Furthermore, such a computation is more accurate on average than two (2) separate mid-point subdivisions. Note that mid-point averaging requires no multiplications, a significant gain over conventional interpolation techniques. As we will see below, the 3-D interpolation for each input color may be performed with no more than two (2) mid-point averaging operations per output separation.

As discussed above, the cube shown in FIG. 4 shows a 64×64×64 tiling of color space (that is, there are 64 cubes, or 65 nodes in each direction). Points anywhere in a 7 bit representation are determined via mid-point interpolations between two (2) nodes within the 64×64×64 tiling. Of all points having eight bit representations, those with the low order bit 0 lie both on the 257×257×257 grid, and on the 129×129×129 grid. These represent approximately one in every 8 points. Points with 8 bit resolution anywhere else are determined via mid-point interpolations between two (2) nodes within a hypothetical 7 bit resolution representation, at least one of which is a vertex in the 64×64×64 tiling. Because at least one vertex of the original 64×64×64 tiling can be used in the final mid-point interpolation and the other vertex used in the final mid-point interpolation is calculated using mid-point interpolation from the original 64×64×64 tiling, the method requires only two mid-point interpolations. In this manner, there are always at most two (2) averagings, which involve at most three (3) points from the 64×64×64 tiling.

In one case out of 64, no averagings are needed, but to simplify logic, this case is done by averaging the point with itself. In that and an additional seven (7) cases, the result of the first averaging yields the desired result.

The implementation of the mid-point averaging technique assumes a final color lookup table having a six bit resolution is given or has been computed. A single point in, for example, the RGB color space is interpolated by using the six (6) high order bits to obtain cell indices j, k, and l. The low order bits are concatenated according to LowIndex=(R & 0x3)|((G & 0x3)<<2)|(B<<4).

The selection of which nodes are used in the averaging is not easily suited to rapid computation. For example, all the nodes represented as spheres in FIG. 4 may be computed by averaging two nodes at vertices of the cube. While it is not difficult to compute which node should be the other node in the average, once node 42a is selected as an anchor node, it is faster to store that information in a lookup table, indexed on the low order bits of the node to be computed. As a second example, consider the point (not shown), midway between nodes 42c (on the front left edge) and 42e (along the main diagonal). That node will be computed as the average of node 42a and an intermediate node (not shown) at the center of the top face of the cube. It is even more attractive to use lookup techniques in order to select these three nodes and their order of interpolation than for the first example.

In light of the foregoing, all the bits of LowIndex are used as an index into a 256 element lookup table. Entries in the 256 element lookup table repeat every 64 nodes. Ten (10) one (1) bit numbers b0 . . . b9 (which may be stored as bytes in a software environment) are retrieved from the table. If b0 is 0, then only one average is needed. The required average would then be retrieved from the lookup table as a function of ((LUT[j+b1] [k+b2] [1+b3]+LUT[j+b4] [k+b5] [1+b6]+1)>>1 (⁶³⁄₆₄ths of the time), where LUT represents "lookup table." Otherwise, two (2) averaging operations are required (q+r+(s<<1)+2)>>2): ((LUT[j+b1] [k+b2] [1+b3]+LUT[j+b4] [k+b5] [1+b6]+LUT[j+b7] [k+b8] [1+b9]<<1)+2>>2. This version involves one (1) branch (de whether two (2) or one (1) interpolations are needed), and so is amenable to machines for which branching is expensive (as is typical of modem machines). An alternative, with still one (1) branch, but this time through a jump table, and one (1) fewer lookup, is to use LowIndex as the control variable for a switch statement. In summary, the operation counts required are given below, where N is the number of output dimensions:

| Operation | Tetrahedral Interpolation | Method 1 | Method 2 |
| --- | --- | --- | --- |
| Add | 3N | (2 57/64)N | (2 57/64)N |
| Shift | N | (1 57/64)N | (1 57/64)N |
| Multiply | 3N | 0 | 0 |
| 3D Lookup | 4 | 3 | 3 |
| 1D Lookup | 0 | 1 | 0 |
| N-way Branch (Switch) | 0 | 0 | 1 |
| Branch | 2.5 | 1 | 0 |

It is anticipated that the savings in branches, multiplies, and three-dimensional lookups will easily outweigh the extra shifts and the switch or one-dimensional lookup.

Note that while the technique described above requires a 64×64×64 lookup table, it is not necessary that such large lookup tables be persistent in a color management system. One can easily upsample lookup tables of conventional sizes (e.g., 16×16×16 to 64×64×64) just prior to processing the image. In fact, the technique just described above provides one (1) possible way to repeatedly upsample the lookup table by a factor of two (2) in each dimension until the desired size is reached. However, the method of interpolation, because it always uses a limited number of vertices from a cube, is unlikely to provide satisfactory results when applied recursively. Therefore, a method is provided for upsampling a table using linear interpolation or cubic interpolation.

It is to be understood that a sparse table is constructed using traditional (data- or model-based) techniques; the full table is then built using interpolation. The interpolation uses a fast bisection technique. Either tri-linear or tri-cubic interpolation may be used depending on the application. Typical table sizes are 9×9×9 or 17×17×17. While the method as described above uses fast interpolation on the final table, the interpolation using tetrahedral or tri-linear interpolation could also be used, at a sacrifice of speed.

As discussed above, constructing high density 3–4 color conversion tables is slow (a typical characterization, yielding a 17×17×17 table using current techniques on a typical workstation may take nine (9) minutes, but with multiple rendering intents, print modes, media, etc. the full characterization may run into a few hours). The characterization is relatively smooth, meaning with a cubic interpolant an 8×8×8 table is likely sufficient for even the most demanding applications. It is even possible for a high end application to generate a full table (i.e. 256×256×256–$2^{24}$ entries), but that would take time proportional to the number of entries, and if a $17^3$ table takes 9 minutes, (roughly $2^{12}$ entries), then a full table would require 4000 times as long, or the better part of a month.

Small lookup tables (e.g. 5×5×5) exhibit two problems: first, they may fail to capture the inherent non-linearity of the conversion process (this will depend on the device, manifesting itself as large errors in regions where the underlying function has high curvature); second, they may show artifacts due to the linear interpolation occurring between nodes (potentially generating artifacts from kinks in the interpolant making sweeps less smooth). Moderate sized tables (e.g. 9×9×9) may continue to have linear interpolation artifacts, but better capture device behavior. A table at 17×17×17 contains all of the information content of a typical characterization, however it is possible that linear interpolation may still be a problem for the most demanding applications. Beyond 33×33×33, linear interpolation is highly unlikely to cause image quality problems. However, very large tables reduce or eliminate the need for interpolation. A 256×256×256 table converting from RGB to L*a*b* (for a scanner), returns the desired color in a single table lookup, but requires 48 Mbytes of memory. A 129×129×129 table requires only 6 Mbytes of memory (and two adds and a shift to interpolate). Because each interpolation is a midpoint subdivision, substantial computational savings is had even with the 129×129×129 table.

Because of the value of using large tables, interpolated or not, the present invention addresses constructing such large tables. Midpoint subdivision is a known, fast means of computing curves and surfaces; this is a generalization to volumes. Midpoint subdivision is numerically stable, but not the only way of doing the interpolation. For example, one could use forward differencing to build a table with any interpolant to any size; for large scale factors this would be faster. However, midpoint subdivision is fast enough for most applications, as timing tests (described below) have shown.

Linear Interpolation

If the input table is at high enough density that the only improvement from going to the large table is speed, the conversion from the input table size to the final table size may be done by repeated midpoint subdivision as follows:

Assume the table to be computed (the final table) has $2^n+1$ entries per dimension, and the input table has $2^m+1$ entries, n>m. In a floating point implementation, begin by storing the table sparsely, so that each entry of the input table is in its final location. Then:

For each dimension
  For k=m to n−1
    For each pair of existing entries $e_i$, $e_{i+2}^{n-k}$;
      Form a new entry $e_{i+2}^{n-k-1}=0.5* (e_i+e_{i+2}^{n-k})$ Here i is the index in the current dimension, k is the current logarithm (base 2) of the table size; and other dimensions are held fixed.

At each iteration of the For k loop, the table size doubles in the current dimension; this continues until the table reaches its final size in the current dimension. This is repeated for each dimension. Thus the table might grow from 9×9×9 to 9×9×17 to 9×9×33 to . . . to 9×9×257, then to 9×17×257, . . . and finally from 129×257×257 to 257×257×257.

In fixed point, the values should be pre-loaded with n-m guard bits. Then the expression for forming a new entry is simply:

$$e_{i+2}{}^{n-k-1}=(e_i+e_{i+2}{}^{n-k})>>1$$

Once the table is fully computed, the guard bits must be discarded:

$$e_{i+2}{}^{n-m-1}=(e_{i+2}{}^{n-m-1}+2^{n-m-1})>>(n-m);$$

A test implementation found that going from 17×17×17 to 257×257×257 required only 13 seconds per separation.

Cubic Interpolation

For smaller input tables or higher accuracy, cubic interpolation may be used. The Bezier cubic provides interpolation of the nodes, and with properly arranged "intermediate nodes", C1 continuity. Other methods could also be used. In one dimension, the process proceeds in two steps:

1. Generate intermediate nodes as:
   $n_{4i}=p_i$
   $n_{4i+1}=p_i+(p_{i+1}-p_{i-1})/4$
   $n_{4i+2}=p_{i+1}+(p_i-p_{i+2})/4$
   $n_{4i+3}=p_{i+1}$ 2. For each level
   For i=0, 3, 6, ... subdivide the segment $n_i$ .. $n_{i+3}$, as follows:
   Compute $n_{i,j+1}$ as $(n_i+n_{i+1})/2$, and similarly compute $n_{i+1,i+2}$ and $n_{i+2,i+3}$;
   Average adjacent pairs from the three just computed —yielding $n_{i,i+2}$ and $n_{i,i+3}$;
   Average the pair just computed, yielding $n_{i,i+3}$.
   Replace the segment with the two segments $n_i$, $n_{i,i+1}$, $n_{i,i+2}$, $n_{i,i+3}$; and $n_{i,i+3}$, $n_{i+1,i+3}$, $n_{i+2,i+3}$, $n_{i+3}$.

At the last iteration, only the new segment joint need be retained.

This would be repeated in each dimension as for tri-linear interpolation. 3 guard bits per level of subdivision are needed for accuracy here, in a fixed point implementation.

This is approximately six times as expensive as linear interpolation, which is still very fast (roughly 80 seconds per separation for a full 257×257×257 table.)

Applications

One application already mentioned is the very large table (257×257×257 or 129×129×129). Another application is fast recharacterization of a device. If a device is well characterized by the information in an 8×8×8 table, but the system uses 16×16×16 or even 32×32×32 to avoid linear interpolation artifacts, the 8×8×8 table can be computed in ⅛ the time of a 16×16×16, or 1/64 the time of a 32×32×32 (in other words a few minutes), and then scaled up with cubic midpoint interpolation in a fraction of a second (even for the 32×32×32 case).

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for converting a specified color value from a first color space to a second color space, the method comprising:
   identifying the specified color value in the first color space;
   receiving a converted color space value from a final lookup table, the converted color space value being previously determined as a function of the specified color value and a non-iterative mid-point interpolation and representing the specified color in the second color space, wherein operations for performing the mid-point interpolation include one or more addition operations and one or more shift operations or division operations; and
   storing the converted color space value in a memory device.

2. The method for converting a color value as set forth in claim 1, further including:
   before the receiving step, creating the final lookup table as a function of an initial lookup table, which has a lower resolution relative to the final lookup table and includes a plurality of the conversion values.

3. The method for converting a color value as set forth in claim 1, wherein the receiving step includes:
   for a current color of interest, performing a number of mid-point interpolations, as a function of the resolution of the final lookup table.

4. The method for converting a color value as set forth in claim 3, wherein the step of performing a mid-point interpolation includes:
   determining an anchor vertex, which is defined within the final lookup table, as a function of the current color;
   determining a first current vertex, which is defined within the final lookup table, as a function of the current color and the anchor vertex; and
   determining a current intermediate color by performing a mid-point interpolation as a function of the anchor and first current vertices.

5. The method for converting a color value as set forth in claim 4, wherein if more than one mid-point interpolation is performed, the method further includes:
   determining a second current vertex, which is defined within the final lookup table, as a function of the current color, the anchor vertex, and the first current vertex; and
   determining a second current intermediate color by performing a mid-point interpolation as a function of the second current vertex and one of the anchor and first current vertices.

6. A method for converting a specified color value from a first color space to a second color space, the method comprising:
   identifying the specified color value in the first color space;
   receiving a converted color space value from a final lookup table, the converted color space value being previously determined as a function of the specified color value and a mid-point interpolation and representing the specified color in the second color space, the receiving step including:
   for a current color of interest, performing a number of mid-point interpolations, as a function of the resolution of the final lookup table, the performing a number of mid-point interpolations step including:
       determining an anchor vertex, which is defined within the final lookup table, as a function of the current color;
       determining a first current vertex, which is defined within the final lookup table, as a function of the current color and the anchor vertex, the steps of determining the anchor vertex and the first current vertex including:

determining a vertex, which is defined within the final lookup table, as a function of a node in the first color space having largest coordinates less than corresponding coordinates of the specified color; and determining a current intermediate color by performing a mid-point interpolation as a function of the anchor and first current vertices; and storing the converted color space value in a memory device.

7. A method for converting a specified color value from a first color space to a second color space, the method comprising:

identifying the specified color value in the first color space;

receiving a converted color space value from a final lookup table, the converted color space value being previously determined as a function of the specified color value and a mid-point interpolation and representing the specified color in the second color space; and if the final lookup table is less than a predefined resolution, receiving a plurality of intermediate color space conversion values from the final lookup table, the converted color space value being determined as a function of the intermediate color space conversion values; and storing the converted color space value in a memory device.

8. The method for converting a color value as set forth in claim 7, wherein if the predefined resolution is half the resolution of the input colors, the step of receiving the plurality of conversion values from the final lookup table includes:

receiving two conversion values from the final lookup table.

9. A method for producing a pixel value in a final color space, the method comprising:

receiving the pixel value, which is represented in an initial color space, into a processing device;

identifying a transformed pixel value, which represents the pixel value in the final color space, as a function of the pixel value and a non-iterative mid-point interpolation within a predefined lookup table, wherein operations for performing the mid-point interpolation include one or more addition operations and one or more shift operations or division operations;

producing the transformed pixel value in the final color space via an output device.

10. The method for producing a pixel value in a final color space as set forth in claim 9, wherein the producing step includes:

producing the transformed pixel in a xerographic environment.

11. The method for producing a pixel value in a final color space as set forth in claim 9, wherein the producing step includes:

producing the transformed pixel via a digital output device.

12. The method for producing a pixel value in a final color space as set forth in claim 9, wherein the identifying step includes:

performing a number of mid-point interpolations as a function of a resolution of the lookup table.

13. The method for producing a pixel value in a final color space as set forth in claim 9, wherein the identifying step includes:

determining an anchor vertex, which is defined within the lookup table, as a function of the pixel value;

determining a current vertex, which is defined within the lookup table, as a function of the pixel value and the anchor vertex; and determining a current intermediate pixel value by performing the mid-point interpolation as a function of the anchor and current vertices.

14. The method for producing a pixel value in a final color space as set forth in claim 13, wherein the identifying step further includes:

determining a second current vertex, which is defined within the final lookup table, as a function of the current color, the anchor vertex, and the current vertex; and determining a second current intermediate color by performing a mid-point interpolation as a function of the second current vertex and one of the anchor and first current vertices.

15. A system for producing a specified color in a final color space, comprising:

means for identifying the specified color value in a first color space;

a processing device for receiving a converted color space value from a lookup table, the converted color space value being previously determined as a function of the specified color value and a non-iterative mid-point interpolation and representing the specified color in the final color space, wherein operations for performing the mid-point interpolation include one or more addition operations and one or more shift operations or division operations;

a memory device for storing the converted color space value; and an output device for producing the converted color space value.

16. The system for producing a pixel value in a final color space as set forth in claim 15, wherein the converted color space values are previously stored in the lookup table.

17. The system for producing a pixel value in a final color space as set forth in claim 15, wherein the output device is a xerographic output device.

18. The system for producing a pixel value in a final color space as set forth in claim 15, wherein the output device is a digital output device.

19. The system for producing a pixel value in a final color space as set forth in claim 15, wherein the processing device performs the mid-point interpolation as a function of an anchor vertex, which is defined in the lookup table as a function of the pixel value, and a first current vertex which is defined in the lookup table as a function of the pixel value and the anchor vertex, a current intermediate pixel value being determined via the mid-point interpolation as a function of the anchor and first current vertices.

20. The system for producing a pixel value in a final color space as set forth in claim 19, wherein the processing device performs an additional mid-point interpolation as a function of a second current vertex, which is defined within the lookup table as a function of the current pixel value, the anchor vertex, and the first current vertex; a second current intermediate pixel value being determined via the mid-point interpolation as a function of the second current vertex and one of the anchor vertex and the first current vertex.

* * * * *